(12) United States Patent
Barna et al.

(10) Patent No.: US 6,834,300 B1
(45) Date of Patent: Dec. 21, 2004

(54) METHOD IN A PACKET DATA NETWORK OF NEGOTIATING REPORTING MECHANISMS AND REPORTING ACCOUNTING RECORDS

(75) Inventors: John Barna, Beaconsfield (CA); Lila Madour, Kirkland (CA); Jean-Charles Gonthier, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 960 days.

(21) Appl. No.: 09/671,454

(22) Filed: Sep. 27, 2000

Related U.S. Application Data

(60) Provisional application No. 60/188,529, filed on Mar. 10, 2000.

(51) Int. Cl.[7] ............................................. G06F 15/173
(52) U.S. Cl. ....................... 709/223; 709/201; 709/203; 709/218; 370/420
(58) Field of Search ................................ 709/223, 201, 709/203, 218; 455/403; 370/338, 352, 420

(56) References Cited

U.S. PATENT DOCUMENTS

| | | | | |
|---|---|---|---|---|
| 5,991,746 A | * | 11/1999 | Wang | 705/40 |
| 6,119,160 A | * | 9/2000 | Zhang et al. | 709/224 |
| 6,181,692 B1 | * | 1/2001 | DeGolia, Jr. | 370/352 |
| 6,292,481 B1 | * | 9/2001 | Voit et al. | 370/352 |
| 6,298,383 B1 | * | 10/2001 | Gutman et al. | 709/229 |
| 6,377,982 B1 | * | 4/2002 | Rai et al. | 709/217 |
| 6,446,122 B1 | * | 9/2002 | Rawat et al. | 709/224 |
| 6,512,763 B1 | * | 1/2003 | DeGolia, Jr. | 370/352 |
| 6,606,311 B1 | * | 8/2003 | Wang et al. | 370/338 |
| 6,615,260 B1 | * | 9/2003 | Honda et al. | 709/224 |

FOREIGN PATENT DOCUMENTS

| | | |
|---|---|---|
| EP | 0973303 | 1/2000 |
| WO | WO 97/23100 | 6/1997 |
| WO | WO 00/44148 | 7/2000 |

* cited by examiner

*Primary Examiner*—Saleh Najjar
(74) *Attorney, Agent, or Firm*—Smith & Danamraj, P.C.

(57) ABSTRACT

A method in a Code Division Multiple Access (CDMA) 2000 packet data network of negotiating reporting mechanisms for accounting records, and sending accounting records from a Packet Data Service Node (PDSN) to an accounting server such as a Home Radius Server utilizing the Radius protocol. The PDSN sends an Access Request (AR) message to the accounting server, via any intermediate nodes, and includes (a) an Accounting Capability (AC) attribute indicating that the PDSN can accumulate a plurality of accounting records and send the accumulated accounting records in a container in a single message, and (b) an Accounting Handling (AH) attribute indicating a plurality of alternative reporting methods that trigger the PDSN to send a container. The Home Radius Server then sends an Access Accept (AA) message to the PDSN that (a) confirms that the Home Radius Server can receive accounting records in containers, and (b) indicates a preferred reporting method for triggering the PDSN to send a container. The PDSN then sends containers of accounting records to the Home Radius Server in accordance with the preferred reporting method. In an alternative embodiment, the PDSN may send containers of accounting records to the Home Radius Server at a pre-configured interval.

10 Claims, 1 Drawing Sheet

METHOD IN A PACKET DATA NETWORK OF NEGOTIATING REPORTING MECHANISMS AND REPORTING ACCOUNTING RECORDS

PRIORITY STATEMENT UNDER 35 U.S.C. §119 (e) & 37 C.F.R. §1.78

This nonprovisional application claims priority based upon the prior U.S. provisional patent application entitled, "Method for Selecting a Packet Data Service Node/Foreign Agent in a Wireless Access", application No. 60/188,529, filed Mar. 10, 2000, in the names of Lila Madour, Louis Segura, Karim Shafik, John Barna, and Jean-Charles Gonthier.

BACKGROUND OF THE INVENTION

1. Technical Field of the Invention

This invention relates to telecommunication systems and, more particularly, to a method in a packet data network of negotiating reporting mechanisms for accounting records and reporting accounting records from a Packet Data Service Node (PDSN) to an accounting server.

2. Description of Related Art

The Code Division Multiple Access (CDMA) 2000 Packet Core Network (PCN) is in the development stage. The development forum is called 3GPP2, and the forum has decided to use Internet Engineering Task Force (IETF) protocols to save development time. In particular, the Radius protocol has been specified for transporting accounting records between Network Access Servers (NASs) in serving networks where mobile stations (MSs) are currently operating, and an Authentication, Authorization, and Accounting (AAA) server (i.e., Home Radius Server) which is normally located in the MS's home network.

"Accounting records" refers to information that may be used for billing purposes, and relates to the network resources utilized by a particular user during a call. When a user accesses a network and starts using the resources of the network, the network keeps track of what resources are used, for what types of services, and for how long. This information is reported to an accounting server which consolidates the accounting information and prepares it for delivery to a billing system which performs billing settlement procedures. Therefore, from the operator point of view, accounting records are extremely important.

The Radius protocol is not very flexible because it was designed for a stable environment in which non-roaming users are provided with dial-up access to the network. It does not provide the flexibility for a home network to control/determine/negotiate accounting reporting methods that could be used by the local networks for the users of that home network. The 3GPP2 forum, however, is attempting to use Radius in a roaming environment in which a mobile user can roam from one network to another. This requires that the Radius protocol be used to communicate between NASs in serving networks and accounting servers in the mobile user's home network or in a broker network. There are problems, however, when attempting to use the Radius protocol to send accounting records for mobile users.

In a roaming environment, there are efficiency and reliability problems with the Radius protocol that may cause the loss of some accounting information. The Radius protocol is currently implemented in such a manner that neither the NAS nor the Home Radius Server have any knowledge of how the network passes information from the serving system to the home system. There may be a number of nodes between the NAS and the Home Radius Server, and if these intermediate nodes do not recognize some of the information elements in a message passing through them, the nodes may filter out the unknown elements or discard the entire message. If the message contains accounting information, then the accounting information is lost.

In the 3GPP2 standards, different events are defined that may occur because of user mobility and the wireless nature of the access. Some parameters in the radio access can change, depending on where the user moves. Parameters such as Quality of Service (QoS), for example, may be renegotiated whenever a user moves to a new network. The user zone may change from cell to cell. Operators want to be notified whenever these changes occur because they are potential billing events. In addition, different operators may desire to have different accounting information supplied by the NAS when different events happen. There is currently no way to provide this type of tailored reporting using the standard Radius protocol. In other words, Radius does not provide the flexibility for a home network to negotiate roaming services (for example, accounting) with the local network for its users in a roaming environment.

The operator may also set a particular tariff for a defined time period such as from 1:00 p.m. to 4:00 p.m. After 4:00 p.m., another tariff may be in effect. Therefore, the network starts sending accounting information before 4:00 p.m. to the accounting server, and then starts a whole new accounting session after 4:00 p.m. In the roaming environment, tariff changes can cause a large amount of information to be reported, depending on the degree of mobility of the user and how many networks are sending information at the same time. The Radius protocol was not designed to handle this type of load or this dynamic network environment. In a non-roaming environment, Radius could handle something like a tariff boundary at 4:00 p.m., but the standards bring in many more reportable events due to user mobility.

The reporting requirements also put a lot of requirements on the NAS, in terms of memory capacity and how many messages it must be able to send. The NAS is also known as a Packet Data Service Node (PDSN), and the Radius protocol does not have any methodology for determining whether the PDSN can handle this load. Likewise, there is no guarantee that the accounting server (in the home network, for example) can handle all of the messages that are being sent.

A recent Contribution to the 3GPP2 forum proposed that instead of sending a Radius accounting message to the accounting server every time an accounting event occurs, the accounting information should be retained in the PDSN for a certain amount of time, or until a certain number of messages have been accumulated, and then the information may be sent in a 3GPP2 vendor-specific container attribute to the Home Radius Server. All of the accumulated information is placed in the container attribute.

However, there are several problems with this approach. First, the Radius protocol today cannot guarantee that this information will make it all the way to the Home Radius Server if an intermediate proxy server or broker server does not recognize the container attribute. If a packet contains an attribute that is not recognized, an intermediate server may filter out the packet. Also, the home network server may not recognize the 3GPP2 extension and may disregard the entire message.

In order to overcome the disadvantage of existing solutions, it would be advantageous to have a method of negotiating reporting mechanisms for accounting records and reporting accounting records to an accounting server that is suitable for use in a mobile environment, and guarantees that accounting information is not lost. The present invention provides such a method.

SUMMARY OF THE INVENTION

In one aspect, the present invention is a method in a packet data network of negotiating reporting mechanisms for accounting records and sending accounting records from a Packet Data Service Node (PDSN) to an accounting server. The method comprises the steps of determining by the PDSN, a reporting level capability for the accounting server and any intermediate nodes between the PDSN and the accounting server, and sending accounting records from the PDSN to the accounting server in accordance with the determined reporting level capability.

In another aspect, the method of the present invention includes the steps of sending a message from the PDSN to the accounting server, via any intermediate nodes, that includes (a) an attribute indicating that the PDSN can accumulate a plurality of accounting records and send the accumulated accounting records in a container in a single message, and (b) an attribute indicating a plurality of alternative reporting methods that trigger the PDSN to send a container. The accounting server then sends a response message to the PDSN that (a) confirms that the accounting server can receive accounting records in containers, and (b) indicates a preferred reporting method for triggering the PDSN to send a container. The PDSN then sends containers of accounting records to the accounting server in accordance with the reporting method preferred by the accounting server. In an alternative embodiment, the PDSN may send containers of accounting records to the accounting server at a pre-configured interval.

DETAILED DESCRIPTION OF EMBODIMENTS

Figure 1:
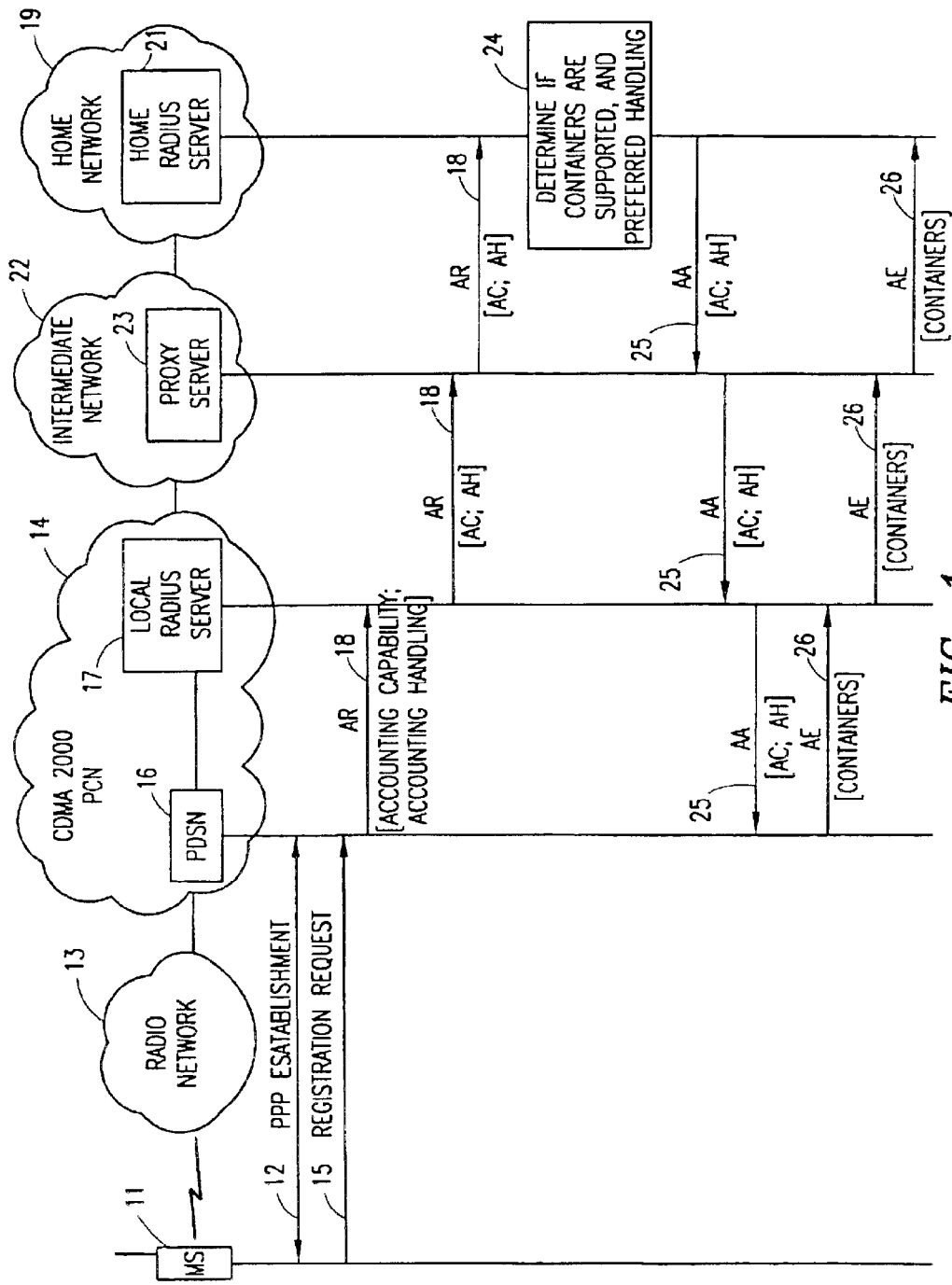
FIG. 1 represents a message flow diagram illustrates the messages sent and actions taken when performing the preferred embodiment of the method of the present invention.
Figure 1:
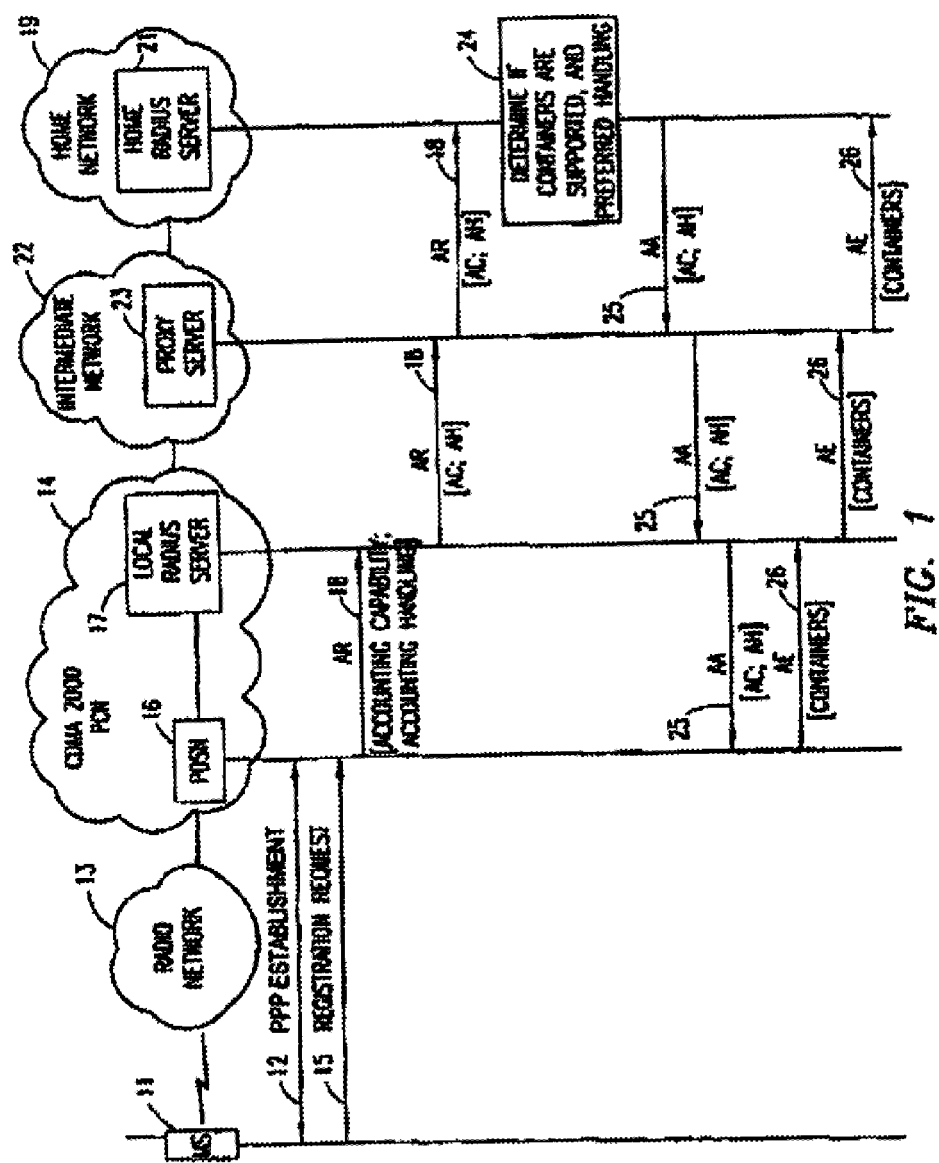

The 3GPP2 standards include provisions that allow for new extensions with new parameters to be added to the existing messages. The extensions for the accounting reporting method of the present invention can be added under these provisions. The new extensions indicate when the PDSN should send reports, and when it should store them.

The use of containers violates the basic Radius model. Radius messages are cumulative, and depend to an extent on previous messages in order to put current messages in the proper context. Storing a plurality of reports and then sending them in one container violates this basic model. The present invention is able to successfully utilize containers with the Radius protocol because it first completes a negotiation process between the PDSN in the serving network and the Home Radius Server in a roaming MS's home network to determine procedures for reporting-accounting records that are acceptable to the PDSN, the Home Radius Server, and any intermediate servers between them.

Before the serving network starts to send accounting messages, or even before a requested service is allocated, the serving network and the home network first attempt to negotiate accounting capabilities and what type of accounting reporting method is to be used. This can be done during the access authorization period. As a result of the negotiation process, the Home Radius Server may tell the PDSN to send records as soon as events happen, or it may tell the PDSN to accumulate records as events happen, store them in containers, and send the containers to the Home Radius Server, for example, at certain trigger points.

The Figure is a message flow diagram illustrating the messages sent and actions taken when performing the preferred embodiment of the method of the present invention. An MS 11 establishes a Point-to-Point Protocol (PPP) link 12 through a radio network 13 to a CDMA 2000 Packet Core Network (PCN) 14. At 15, the MS requests access to the PCN. The Packet Data Service Node (PDSN) 16 is the first access point to the PCN. A PDSN is similar to a NAS with additional functionality to handle mobility. The PCN also includes a Local Radius Server 17.

When the MS requests access, a connection is established to the PDSN 16. The PDSN determines whether the MS is authorized to make an access. The PDSN sends an Access Request (AR) message 18 to the Local Radius Server 17 and includes its accounting-reporting capabilities. The AR message includes two attributes: (1) an Accounting Capability (AC) attribute that specifies whether or not the PDSN supports containers, and specifies whether the PDSN can provide more information than the standard accounting information; and (2) an Accounting Handling (AH) attribute that specifies the frequency with which the PDSN can send the containers, or the events that trigger the PDSN to send the containers. The AH attribute contains values that indicate several alternative reporting triggers that the PDSN supports. For example, the PDSN may support sending containers (a) periodically at a specified or pre-configured interval, (b) at the end of each accounting session, as defined by a new accounting event, or (c) at the end of an accounting multi-session or the end of the entire packet data session when the MS disconnects from the PDSN.

The MS has a home network 19 with a Home Radius Server 21 that stores all of the MS subscription information. For simplicity, it is assumed that the Home Radius server also does the accounting for the MS although 10 this function may be performed by a separate server. The Local Radius Server 17 sends the AR message 18 to the Home Radius Server. This message may pass through one or more intermediate networks 22 and proxy servers 23. At 24, the Home Radius Server determines whether it recognizes and supports the AC and AH attributes in the AR message. If the attributes are not understood by the Radius Server, the message may be discarded, or the attributes may be ignored. In this case, the process falls back to normal Radius procedures. If the Home Radius Server recognizes and supports the AC and AH attributes, it determines a preferred container handling method and sends an Access Accept (AA) message 25 back to the PDSN 16, and includes the AC and AH attributes while specifying the preferred container handling method in the AH attribute. Alternatively, if the Home Radius Server supports more than one of the proposed reporting methods, it may list them in a preferred order in the AH attribute.

Since the present invention sends the AR message 18 and the AC and AH attributes all the way to the Home Network Server 21, then it is assured that intermediate proxy servers 23 also recognize the attributes and are not filtering them out. If an intermediate server does not recognize, for example, the AC attribute, the intermediate server filters out the attribute and the AR message is received in the Home Radius Server without that attribute. In this case, the AA message 25 sent from the Home Radius Server to the PDSN in response to the AR message indicates that containers are not to be used. This ensures that containers are not used when any node in the link does not support them. Thus, the procedure falls back to the normal Radius procedures.

When the Home Radius Server returns the AC attribute in the AA message, indicating that it is capable of handling containers, this indicates that the Home Radius Server is also capable of handling a new Accounting Event (AE) message 26. The AE message is used whenever containers are sent, but may also be used for other accounting events that are not containers. The AE message is sent from the PDSN 16 through the Local Radius Server 17 to the Home Radius Server 21. The container includes all of the accounting information that happened during that particular accounting session or multi-session, as specified by the Home Radius Server in the AA message 25.

If the Home Radius Server specifies, for example, the alternative in which containers are sent periodically, the AA message 25 should include a Container Interval (CI) attribute to indicate the value of the interval. Alternatively, a default interval may be utilized. The CI attribute is not the same as the Accounting-Interim-Interval attribute specified in the Radius extension draft. The CI interval may be longer than the accounting session or accounting multi-session.

The Home Radius Server may include the Accounting-Interim-Interval attribute along with the CI attribute in the AA message. In this case, the PDSN selects one method or the other, but not both. The PDSN may provide interim accounting reports at the specified interval, or it may use a pre-configured interval that overrides the received CI attribute. For Home Radius Servers that are not 3GPP2 compliant, the Accounting-Interim-Interval may be sent in the AA message even if the PDSN cannot provide interim accounting. This is not a problem since the PDSN will send individual records using normal Radius procedures, which the Home Radius Server can always accept. However, if the Home Radius Server does not include either the CI attribute or the Accounting-Interim-Interval attribute in the AA message, the PDSN cannot use interim messages.

If the Home Radius Server specifies the alternative in which containers are sent at the end of each accounting session, the PDSN sends a container whenever an accounting event specified by 3GPP2 occurs, and a new accounting session is created.

If the Home Radius Server specifies the alternative in which containers are sent at the end of an accounting multi-session or at the end of the entire packet data session, the AA message 25 should include an attribute indicating either the number of sessions to be included in each container, or that reports should be accumulated until the end of the packet data session. The PDSN 16 then sends containers to the Home Radius Server after the specified number of accounting sessions or at the end of the packet data session. The PDSN must send a START Accounting message to the Home Radius Server at the start of a multi-session period. The message contains a multi-session ID and the user Network Access Identifier (NAI).

The PDSN must also send a STOP message to the Home Radius Server when the packet data session is terminated. If more than one accounting session was created during the multi-session or packet data session, the PDSN may send a last AE message to the Home Radius Server containing data up to, but not including, the last accounting session. After the Home Radius Server acknowledges this message, the PDSN sends a final STOP message to the Home Radius Server containing the data from the last accounting session. In this manner, the multi-session ends the same way as a normal Radius session. Alternatively, the last AE message from the PDSN to the Home Radius Server may contain all of the accounting data, including the data from the last accounting session. In this case, the STOP message only needs to contain identification information, corresponding to the information in the START message.

It is thus believed that the operation and construction of the present invention will be apparent from the foregoing description. While the method shown and described has been characterized as being preferred, it will be readily apparent that various changes and modifications could be made therein without departing from the scope of the invention as defined in the following claims.

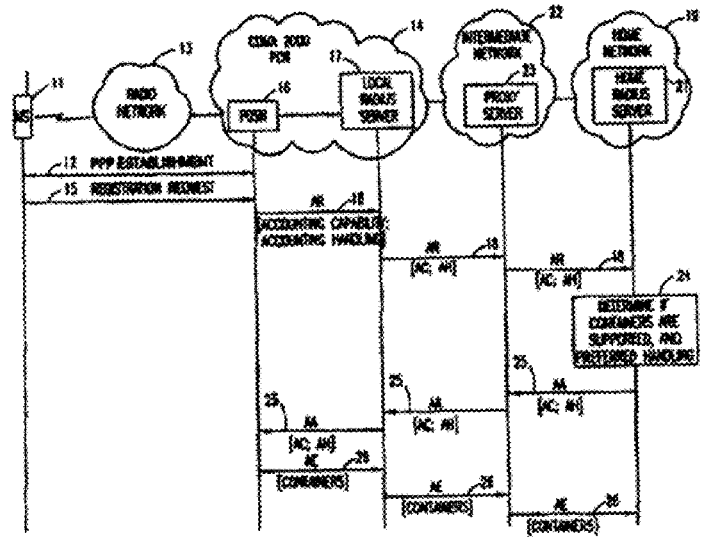

What is claimed is:

1. A method in a packet data network of negotiating reporting mechanisms for accounting records between a Packet Data Service Node (PDSN) and an accounting server, said method comprising the steps of:

determining by the PDSN, a reporting level capability for the accounting server and any intermediate nodes between the PDSN and the accounting server; and sending accounting records from the PDSN to the accounting server in accordance with the determined reporting level capability.

2. The method of claim 1 wherein the step of determining a reporting level capability for the accounting server and any intermediate nodes includes the steps of:

sending a message from the PDSN to the accounting server via the intermediate nodes, if any, that includes a reporting level capability of the PDSN; and sending a response message from the accounting server to the PDSN that confirms that the accounting server can handle accounting records received in accordance with the reporting level capability of the PDSN.

3. The method of claim 2 wherein the step of sending a message from the PDSN to the accounting server that includes a reporting level capability of the PDSN includes sending a message that includes an attribute indicating that the PDSN can accumulate a plurality of accounting records and send the accumulated accounting records in a container in a single message.

4. The method of claim 3 wherein the step of sending a message that includes an attribute indicating that the PDSN can accumulate a plurality of accounting records and send the accumulated accounting records in a container in a single message includes sending a message that also includes an attribute indicating a plurality of alternative reporting methods that trigger the PDSN to send a container.

5. The method of claim 4 wherein the plurality of alternative reporting methods includes sending reports (a) periodically at a specified interval, (b) after each accounting session, as defined by a new accounting event, or (c) after an accounting multi-session, at the end of an entire packet data session.

6. The method of claim 4 wherein the step of sending a response message from the accounting server to the PDSN includes sending a response message that also includes a preferred reporting method for triggering the PDSN to send a container.

7. A method in a packet data network of reporting accounting records from a Packet Data Service Node (PDSN) to an accounting server, said method comprising the steps of:

sending a message from the PDSN to the accounting server, via any intermediate nodes, that includes an attribute indicating that the PDSN can accumulate a plurality of accounting records and send the accumulated accounting records in a container in a single message;

sending a response message from the accounting server to the PDSN that confirms that the accounting server can receive accounting records in containers; and sending containers of accounting records from the PDSN to the accounting server at a pre-configured interval.

8. A method in a packet data network of reporting accounting records from a Packet Data Service Node (PDSN) to an accounting server, said method comprising the steps of:

sending a message from the PDSN to the accounting server, via any intermediate nodes, that includes (a) an attribute indicating that the PDSN can accumulate a plurality of accounting records and send the accumulated accounting records in a container in a single message, and (b) an attribute indicating a plurality of alternative reporting methods that trigger the PDSN to send a container;

sending a response message from the accounting server to the PDSN that (a) confirms that the accounting server can receive accounting records in containers, and (b) indicates a preferred reporting method for triggering the PDSN to send a container; and sending containers of accounting records from the PDSN to the accounting server at in accordance with the reporting method preferred by the accounting server.

9. The method of claim 8 wherein the response message from the accounting server indicates a preferred reporting method in which containers are to be sent at the end of a packet data session after a plurality of accounting sessions, and the method also comprises the steps of:

sending a START message from the PDSN to the accounting server when the packet data session begins, said START message including a session identification; and sending a STOP message from the PDSN to the accounting server when the packet data session ends.

10. The method of claim 9 further comprising, before the step of sending a STOP message, the steps of:

sending a last container message from the PDSN to the Home Radius Server containing accounting records up to, but not including, a last accounting session in the plurality of accounting sessions; and including accounting records from the last accounting session in the STOP message.

* * * * *

UNITED STATES PATENT AND TRADEMARK OFFICE
CERTIFICATE OF CORRECTION

PATENT NO.        : 6,834,300 B1
APPLICATION NO. : 09/671454
DATED             : December 21, 2004
INVENTOR(S)       : Barna et al.

It is certified that error appears in the above-identified patent and that said Letters Patent is hereby corrected as shown below:

Delete Title page illustrating a figure, and substitute therefor, new Title page illustrating a figure. (attached)

Delete drawing sheet consisting of figure 1, and substitute therefor drawing sheet consisting of figure 1. (attached)

Column 3, line 39, after "diagram" insert --which--.

Column 8, line 2, after "server" delete --at--.

Signed and Sealed this

Twenty-eighth Day of October, 2008

JON W. DUDAS
*Director of the United States Patent and Trademark Office*

(12) United States Patent
Barna et al.

(10) Patent No.: US 6,834,300 B1
(45) Date of Patent: Dec. 21, 2004

(54) METHOD IN A PACKET DATA NETWORK OF NEGOTIATING REPORTING MECHANISMS AND REPORTING ACCOUNTING RECORDS

(75) Inventors: John Barna, Beaconsfield (CA); Lila Madour, Kirkland (CA); Jean-Charles Genthier, Montreal (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 960 days.

(21) Appl. No.: 09/671,454

(22) Filed: Sep. 27, 2000

Related U.S. Application Data

(60) Provisional application No. 60/188,529, filed on Mar. 10, 2000.

(51) Int. Cl. .................................................. G06F 15/173
(52) U.S. Cl. ........................ 709/223; 709/201; 709/203; 709/218; 370/420
(58) Field of Search ............................ 709/223, 201, 709/203, 218; 455/403; 370/338, 352, 420

(56) References Cited

U.S. PATENT DOCUMENTS

| | | | |
|---|---|---|---|
| 5,891,746 A | * 11/1999 | Wang | 705/40 |
| 6,119,160 A | * 9/2000 | Zhang et al. | 709/224 |
| 6,181,692 B1 | * 1/2001 | DeGolia, Jr. | 370/352 |
| 6,292,481 B1 | * 9/2001 | Voit et al. | 370/352 |
| 6,298,383 B1 | * 10/2001 | Gutman et al. | 709/229 |
| 6,377,982 B1 | * 4/2002 | Rai et al. | 709/217 |
| 6,446,122 B1 | * 9/2002 | Rawat et al. | 709/224 |
| 6,512,763 B1 | * 1/2003 | DeGolia, Jr. | 370/352 |
| 6,606,311 B1 | * 8/2003 | Wang et al. | 370/338 |
| 6,615,260 B1 | * 9/2003 | Honda et al. | 709/224 |

FOREIGN PATENT DOCUMENTS

| | | |
|---|---|---|
| EP | 0973303 | 1/2000 |
| WO | WO 97/23100 | 6/1997 |
| WO | WO 00/44148 | 7/2000 |

\* cited by examiner

*Primary Examiner*—Saleh Najjar
(74) *Attorney, Agent, or Firm*—Smith & Danamraj, P.C.

(57) ABSTRACT

A method in a Code Division Multiple Access (CDMA) 2000 packet data network of negotiating reporting mechanisms for accounting records, and sending accounting records from a Packet Data Service Node (PDSN) to an accounting server such as a Home Radius Server utilizing the Radius protocol. The PDSN sends an Access Request (AR) message to the accounting server, via any intermediate nodes, and includes (a) an Accounting Capability (AC) attribute indicating that the PDSN can accumulate a plurality of accounting records and send the accumulated accounting records in a container in a single message, and (b) an Accounting Handling (AH) attribute indicating a plurality of alternative reporting methods that trigger the PDSN to send a container. The Home Radius Server then sends an Access Accept (AA) message to the PDSN that (a) confirms that the Home Radius Server can receive accounting records in containers, and (b) indicates a preferred reporting method for triggering the PDSN to send a container. The PDSN then sends containers of accounting records to the Home Radius Server in accordance with the preferred reporting method. In an alternative embodiment, the PDSN may send containers of accounting records to the Home Radius Server at a pre-configured interval.

10 Claims, 1 Drawing Sheet